United States Patent [19]
Fischer et al.

[11] 4,350,809
[45] Sep. 21, 1982

[54] PROCESS FOR THE PREPARATION OF COPOLYMERS CONTAINING HYDROXYL GROUPS

[75] Inventors: Hannes Fischer, Taunusstein; Helmut Plum, Übach-Palenberg, both of Fed. Rep. of Germany

[73] Assignee: Hoechst Aktiengesellschaft, Frankfurt am Main, Fed. Rep. of Germany

[21] Appl. No.: 197,899

[22] Filed: Oct. 17, 1980

[30] Foreign Application Priority Data

Oct. 19, 1979 [DE] Fed. Rep. of Germany ....... 2942327

[51] Int. Cl.$^3$ .............................................. C08G 63/06
[52] U.S. Cl. ..................................... 528/361; 428/413; 428/500; 528/271; 528/366; 528/393
[58] Field of Search ................ 528/361, 271, 366, 393

[56] References Cited
U.S. PATENT DOCUMENTS 3,530,096  9/1970  Dobinson et al. ................... 528/361
3,558,742  1/1971  Schmid et al. ...................... 528/361

OTHER PUBLICATIONS

The Condensed Chemical Dictionary, 7th ed., p. 454.

Primary Examiner—Harold D. Anderson
Attorney, Agent, or Firm—Hammond & Littell, Weissenberger and Muserlian

[57] ABSTRACT

A process for the preparation of copolymers containing hydroxyl groups by radical reaction of
(A) 10 to 30% by weight of at least one glycidyl ester containing 12 to 14 carbon atoms, of an aliphatic saturated monocarboxylic acid with a tertiary or quaternary α-carbon atom; and
(B) 90 to 70% by weight of at least two unsaturated copolymerisable monomers, at least one of which contains at least one carboxyl group, wherein component (A) is introduced first to a reaction zone and is then reacted at a temperature of at least 140° C. with component (B) and a radical initiator, the component (B) containing a monomer having carboxyl groups, wherein for the preparation of low-viscosity copolymers component (A) is reacted at 140 to 200° C. by substance polymerisation until a degree of reaction of at least 95% is achieved, the component (B) containing at least 3.3% by weight of the monomer having carboxyl groups, and an article coated with a product of said process.

6 Claims, No Drawings

PROCESS FOR THE PREPARATION OF COPOLYMERS CONTAINING HYDROXYL GROUPS

The preparation of externally cross-linkable copolymers containing hydroxyl groups by radical polymerisation in solution is known. However, the known processes are generally of low suitability for the preparation of low-viscosity copolymers having a low solvent content or being free of solvent, for any one of the following reasons: because they require high pressures to effect polymerisation; because the polymerisation is effected in high-boiling solvents which have to be removed at the end of polymerisation by vacuum distillation; because the properties of the polymer are prejudiced by fractions of the polymerisation modifiers and initiators which are used in considerable quantities; or because the polymerisation modifiers which are employed are foul-smelling or toxic.

On the other hand, mass polymerisation is also known. The great advantage of mass polymerisation is that only the monomer, polymer and initiator are present in the reaction mass and very pure solvent-free products are therefore obtained. In practice, however, examples of such polymerisation are rare, since considerable difficulties arise due to the release of very large quantities of heat in a short reaction time. To avoid these difficulties in the known processes, the polymerisation process is terminated when a small quantity of reaction product has formed and the remaining monomers are distilled off, or polymerisation is effected in two stages. In the first stage of such a two stage process, polymerisation is only partially effected and then in the second stage, the polymerisation is completed in a thin layer in suitable apparatus. However, this process is relatively complicated.

A process for the preparation of radical initiated substance polymers is described in German OLS No. 2,840,251. However, the process is restricted to copolymers of acrylic monomers and unsaturated monomers, preferably to fumaric and maleic acid diesters. The acrylic monomers which are preferably used are those whose homopolymers have glass transition temperatures of −40° C. or less. The copolymers described are suitable only as lubricants, wetting agents, levelling agents or softeners.

German OLS No. 2,703,311 describes the preparation of an acrylic resin by mass copolymerisation of (1) hydroxyalkyl acrylate and/or methacrylate,
(2) styrene or its derivatives,
(3) alkyl acrylates and/or methacrylates,
(4) olefinically unsaturated mono- or dicarboxylic acids, e.g. acrylic or methacrylic acid or maleic acid hemiesters, and
(5) monoallyl ethers of a trihydric alcohol.

The component mentioned in (5) above is an essential constituent for the copolymerisation process, since in the process the mass copolymerisation is not realisable with only components (1) to (4). However, this process has the disadvantage that unreacted monomer remains, which has a troublesome effect in the final product. This residual portion may amount to about 5 to 64% by weight relative to the amount of monomer (5) used.

German OLS No. 2,422,043 describes the substance copolymerisation of (A) vinyl or vinylidene chloride or a vinyl monocarboxylate,
(B) vinyl aromatics, and
(C) optionally acrylates of monohydric or dihydric alcohols and further copolymerisable monomers.

German ALS No. 2,626,990 describes the preparation of copolymers containing hydroxyl groups from styrene, methyl methacrylate, hydroxyethyl methacrylate, acrylic acid and glycidyl esters of mono- and/or dialkylalkane monocarboxylic acids in particular mutual quantitative ratios. The polymerisation is effected in organic solvents in the presence of polymerisation initiators and optionally chain breakers, at least 30% by weight of solvent being present, so that products with a solids content of 61 to 70% by weight are obtained. In this case also, the high proportion of solvents and polymerisation initiators or modifiers must be removed from the product, since otherwise the properties of the products are unfavourably influenced. In addition, this process is not suitable for the preparation of low-viscosity copolymers.

However, in order to achieve a yield of over 98%, this polymerisation process can only be effected within a relatively narrow temperature range of 150° to 180° C. As the Examples of this specification show, only products with a relatively high molecular weight are obtained in the process. Moreover, the component (A) can be copolymerised under normal pressure only when an ester of a monocarboxylic acid with more than 9 carbon atoms is used.

There is therefore a need for a mass copolymerisation process which provides solvent-free, low-viscosity and pure products and which process is capable of being effected within a wide temperature range.

The present invention relates to a process for the preparation of copolymers containing hydroxyl groups by radical reaction of (A) 10 to 30% by weight of at least one glycidyl ester containing 12 to 14 carbon atoms, of an aliphatic saturated monocarboxylic acid with a tertiary or quaternary α-carbon atom; and (B) 90 to 70% by weight of at least two unsaturated copolymerisable monomers, at least one of which contains at least one carboxyl group,
wherein component (A) is introduced first to a reaction zone and is then reacted at a temperature of at least 140° C. with component (B) and a radical initiator, the component (B) containing a monomer having carboxyl groups, wherein for the preparation of low-viscosity copolymers component (A) is reacted at 140° to 200° C. by substance polymerisation until a degree of reaction of at least 95% is achieved, the component (B) containing at least 3.3% by weight of the monomer having carboxyl groups.

By the term "substance polymerisation" is meant a polymerisation which is, as a rule, effected without solvent. In many cases, however, the presence of a small proportion of solvent, namely up to 5, preferably up to 3% by weight, relative to the starting components, is also possible. However, working without solvent is to be preferred.

Solvents which may be used include e.g. high-boiling aliphatic and/or aromatic solvents with boiling points of 140° to 185° C., such as mineral oils with boiling points of 160° to 180° C., xylenes, toluene, esters such as butyl acetate, ethylene glycol acetate monoethyl-, -methyl- or -butylether, alcohols or the like.

The process according to the invention permits a simple substantially solvent-free preparation of acrylate copolymers containing OH groups, the desired low-viscosity, and hence low-molecular weight, products being obtained in a high purity.

As component (A) is first taken and component (B) is reacted therewith there is achieved not only an initial dissolving effect for the monomers (B) to be polymerised, but also, at the same time, a good and rapid removal of reaction heat and, during the reaction, a complete incorporation of the glycidyl ester into the copolymerisation product so that unreacted troublesome constituents are not present in the final product.

One advantage of the reaction according to the invention resides in that it can be effected without modifiers and in that the products are therefore free of toxic and foul-smelling constituents. A further advantage of the process according to the invention is afforded by the fact that due to the simplicity of the process it can be effected in a reaction vessel which is also suitable for polymerisation in solution. The heat of polymerisation which is produced can be readily controlled without difficulty. An especial advantage of this polymerisation process is a better yield of copolymer using existing reaction apparatus.

The copolymers prepared by the process according to the invention are characterised by an especially low solution viscosity. In general, this lies in the range from 30 to 2000, preferably 70 to 700 mPa.s (50% in xylene/20° C.). They are suitable for use in 2-component coating compositions especially for so-called "high-solids" systems, hence for solvent-containing mixtures with a high solids content.

Conventional radical-forming compounds may be used as polymerisation initiators for the process according to the invention. These include e.g. aliphatic azo compounds such as azoisobutyric acid nitrile, diacyl peroxides such as dibenzoyl peroxide, dialkyl peroxides such as di-tert-butyl peroxide or alkyl hydroxyperoxides such as di-tert.-butyl hydroperoxides. Di-tert.-butyl peroxide is especially preferred. The proportion of initiators may be e.g. 0.5 to 2.5, preferably to 1.9% by weight, relative to the total weight of the starting components.

Component (B) conveniently consists of a mixture of one or more olefinically unsaturated monomers, especially acidic acrylic monomers, together with one or more vinyl aromatic hydrocarbons such as styrene, alkylstyrenes, e.g. α-methylstyrene, α-chlorostyrene, or the various vinyl toluenes. Suitable acidic acrylic monomers are e.g. acrylic and/or methacrylic acid and/or maleic acid hemiesters and/or maleic acid. Monomers without COOH groups include e.g. acrylates and/or methacrylates of monohydric alcohols with 1 to 8 carbon atoms and the hydroxyalkylates of these acids with 2 to 4 carbon atoms in the hydroxyalkyl radical, and acrylonitrile. Suitable acrylates are e.g. the methylates, ethylates, tert.-butylates, 2-ethylhexylates, hydroxyethylates and hydroxypropylates of acrylic or methacrylic acid.

In the starting monomer mixture the component (B) conveniently consists of a mixture of (a) 3.3 to 20, preferably 3.3 to 15% by weight of an α,β-unsaturated monocarboxylic acid, preferably acrylic or methacrylic acid or mixtures thereof, (b) 0 to 43, preferably 17 to 43% by weight of a hydroxyalkylate of acrylic acid or methacrylic acid with 2 to 4 carbon atoms in the hydroxyalkyl radical or mixtures thereof, (c) 0 to 57, preferably 5 to 29% by weight of an ester of acrylic or methacrylic acid with a monohydric alcohol with 1 to 8 carbon atoms or mixtures thereof, (d) 0 to 72, preferably 22 to 50% by weight of at least one vinyl aromatic hydrocarbon, the sum of the components (a) to (d) always being 100 and the sum of the esters desirably being not more than 75% by weight.

During the polymerisation reaction there is formed from the acidic acrylic monomer and the glycidyl ester a reaction product which is present, in general, in a proportion of 13.3 to 50, preferably 13.3 to 45% by weight in the copolymer obtained according to the invention.

The products obtained according to the invention may be used alone or in the form of solutions, as binding agents for the preparation of coating compositions. They can be hardened in the presence of suitable cross-linking agents at ambient or elevated temperatures. Suitable solvents for the products obtained according to the invention include e.g. aromatic hydrocarbons such as benzene or alkylbenzenes, e.g. xylene and toluene; monocarboxylates such as ethyl acetate, butyl acetate, ethylene glycol monoethylether acetate, the corresponding methylether acetate or the like.

Preferably polyisocyanates are suitable for the hardening of the products according to the invention, especially at room temperature, with cross-linking. The cross-linking may be catalysed by the addition of organotin compounds such as dibutyl stannic dilaurate, dibutyl stannic diacetate, dibutyl oxotin and optionally tertiary amines, preferably diethylethanolamine. For hardening at elevated temperatures masked polyisocyanates, polycarboxylic acids or their anhydrides may also be used.

Suitable isocyanates include aliphatic, cycloaliphatic or aromatic polyisocyanates such as hexamethylenediisocyanate, isophorone diisocyanate or tolylene-2,4-diisocyanate or mixtures thereof.

Polyisocyanates containing urethane groups and/or biuret groups are preferably used, such as those formed from 2,4- and 2,6-tolylene diisocyanate, hexamethylene-1,6-diisocyanate, diphenylmethane-4,4'-diisocyanate and/or 3-isocyanatomethyl-3,5,5-trimethylcyclohexylisocyanate.

Especially preferred is a polyisocyanate which contains biuret groups and which is obtained from 3 moles of hexamethylene diisocyanate and 1 mole of water.

Suitable cross-linking agents also include aminoplast resins or phenolic resins which harden in the presence of acids, e.g. p-toluenesulphonic acid. Hot hardening may be effected in a conventional way at temperatures of 120° to 200° C., e.g. in 10 to 30 minutes.

The products prepared according to the invention are also suitable for the preparation of powder coating compositions in conjunction with polycarboxylic acid anhydrides. They may additionally be employed for reaction with polycarboxylic acid anhydrides and for the further use of the products thus obtained as hardeners for various synthetic resins, especially epoxy resins.

Especially interesting is the use of the products prepared according to the invention together with special polycarboxylic acid partial esters, units of polycarboxylic acids or their anhydrides or ester anhydrides, e.g. the esters of tricarboxylic heterocyclic or aromatic acids and di- to hexahydric polyols, and their anhydrides and ester anhydrides, such as of the formulae

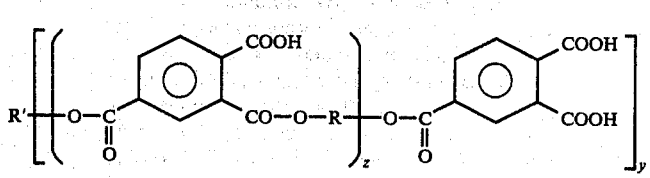  (I)

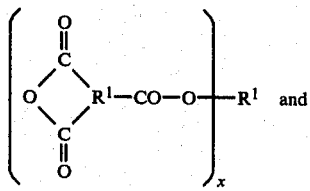 and  (II)

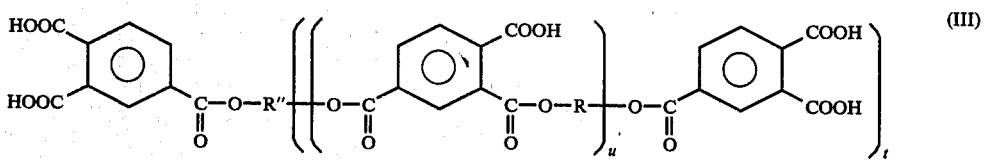  (III)

or their anhydrides or the like, for the hardening of polyepoxides, wherein in the above formulae R, R' and R" are the same or different and represent divalent to hexavalent, preferably divalent, straight-chained or branched hydrocarbon radicals with a total of 1 to 12, preferably 2 to 6 carbon atoms, which optionally contain up to 2 olefinic double bonds or are interrupted by up to 3 ether bridges;

$R^1$ represents an aromatic radical selected from phenyl, naphthyl, phenanthryl and aminonaphthyl groups, or a heterocyclic tetrahydrofuryl radical;

x represents an integer from 2 to 6;

y represents an integer from 2 to 6;

z and u are the same or different and each represents zero or an integer from 1 to 5, and t represents an integer from 1 to 5.

It should be noted that in the formulae represented here only linearly, that is for divalent radicals R, R' and R", branches may be present in the radicals R' and R", as well as in the radical R. Such branched polycarboxylic acids cannot be represented directly by a single formula. If the compounds I to III are branched because R, R' and R" are more than divalent, the subscripts x, z and u may be the same or different in the various branches.

Preferred polycarboxylic acid units are e.g. polyanhydrides which are derived from at least tetrafunctional carboxylic acids and which can be reacted with the products prepared according to the invention. Owing to their high reactivity these systems are especially interesting for cold hardening.

The invention will now be illustrated in the following Examples, in which T represents parts by weight and % represents percent by weight.

EXAMPLES (I) Preparation of copolymers

The glycidyl ester of an α,α-dialkylalkane monocarboxylic acid ($C_{9-11}$) is introduced into a reactor equipped with an agitator, inert-gas inlet, heating and cooling system and feed device and is heated under an inert gas to the desired temperature. The monomer mixture together with the initiator is then added slowly over 7 hours. Subsequently, polymerisation is continued until a reaction degree of at least 98% is achieved.

The ingredients in parts by weight, reaction conditions and characteristics of the products are set out in the following table:

| Example | A | B | C | D |
|---|---|---|---|---|
| Glycidyl ester | 20.4 | 12.9 | 19.5 | 9.4 |
| Monomer mixture/Initiator | | | | |
| Acrylic acid | 6.1 | 4.1 | 6.8 | 3.0 |
| Hydroxyethyl methacrylate | 13.1 | 27.8 | 16.1 | 24.6 |
| Styrene | 38.2 | 46.7 | 32.5 | 35.0 |
| Methyl methacrylate | 20.7 | 7.5 | 24.1 | 26.9 |
| di-t.-butylperoxide | 1.5 | 1.0 | 1.0 | 1.1 |
| Polymerisation temperature °C. | 185 | 190 | 160 | 175 |
| Product | | | | |
| Acid number | 8 | 9 | 13 | 7 |
| Hydroxyl number | 106 | 140 | 112 | 133 |
| Viscosity mPa.s (50% in xylene) | 90 | 185 | 900 | 170 |

(II) Preparation of coating compositions

From the solid resins B to D, 60% solutions are prepared in a solvent mixture of 2T of xylene and 1T of ethylene glycol monoethylether acetate. Coating compositions are prepared with these solutions according to the following formulations:

| | B | C | D |
|---|---|---|---|
| Copolymer solution | 71.16 | 75.62 | 73.85 |
| Dibutyl stannic dilaurate (1% in xylene) | 0.25 | 0.25 | 0.25 |
| Diethylethanolamine | 0.40 | 0.40 | 0.40 |
| Silicone (1% in xylene) | 1.00 | 1.00 | 1.00 |
| Reaction product of hexamethylene Diisocyanate (isocyanate content 16.5%) and water (75% in ethyleneglycolmonoethyletheracetate) | 27.19 | 22.73 | 24.50 |

The polymer solutions are adjusted to a viscosity (DIN 53211/20° C.) of 50 s with a solvent mixture of xylene, an aromatic hydrocarbon mixture (boiling range 165° to 175° C.), butyl acetate and ethyleneglycolmonoethyletheracetate (weight ratio 40:25:20:15) and they are then applied to glass plates and steel sheets in a wet layer thickness of 100 μm. The films are dried in air at room temperature.

(III) Coating test

The tack-free drying time was determined by placing the edge of the hand on the coated surface.

To determine the dryness to dust, reflecting beads with a diameter of 0.1 to 0.4 mm were applied to the film coating over a width of 5 mm by means of a pipette. The coated glass plate was then tilted and knocked. When all the beads dropped off, the film was dry to dust. The tests gave the following results:

|  | B | C | D |
|---|---|---|---|
| Dry (to dust) min. | 15 | 17 | 17 |
| Dry (tack-free) min. | 130 | 92 | 172 |
| Pendulum hardness s according to Konig DIN 53 157 after 24 hours | 101 | 94 | 93 |
| Erichsen depression to DIN 53 156 after 10 days | 9.1 | 9.4 | 9.3 |
| Resistance to petrol after 10 days min. | >30 | >30 | >30 |
| Solids content % 1h/125° C. | 65.7 | 53.0 | 62.3 |

With the product according to Example A coatings with equally good properties are obtained.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A process for the preparation of a copolymer containing hydroxy groups formed by reaction of
   (A) 10 to 30% by weight of at least one glycidyl ester of an aliphatic saturated monocarboxylic acid having tertiary or quaternary α carbon atom, said glycidyl ester containing in total 12 to 14 carbon atoms; and
   (B) 90 to 70% by weight of at least two unsaturated copolymerisable monomers, at least one of which contains at least one carboxyl group,
the weight percentage being based on the total of (A) plus (B) totalling always 100%, comprising first introducing component (A) to a reaction zone and polymerizing without a solvent component (A) with component (B) at 140° to 200° C. in the presence of a radical initiator until a degree of polymerization of the monomers of at least 95% is achieved to obtain a solvent-free, low-viscosity copolymer having free —OH groups and ester groups, component (B) containing at least 3.3% by weight of a monomer having carboxyl groups.

2. A process as claimed in claim 1, wherein component (B) consists of a combination of at least one acrylic monomer and at least one vinyl aromatic compound.

3. A process as claimed in claim 1, wherein a copolymer having a viscosity between 30 and 2000 mPa.s (measured as a 50% solution in xylene/20° is produced).

4. A process as claimed in claim 1, wherein component (B) consists of a composition of
   (a) between 3.3 and 20% by weight of acrylic acid, methacrylic acid or a combination of both,
   (b) between 0 and 43% by weight of at least one hydroxyalkyl ester of acrylic acid, methacrylic acid or a combination of both, which ester has between 2 and 4 carbon atoms in the hydroxyalkyl radical,
   (c) between 0 and 57% by weight of at least one ester of a monohydric alcohol having 1 to 8 carbon atoms and of acrylic acid or methacrylic acid, and
   (d) between 0 and 72% by weight of at least one vinylaromatic compound,
wherein the total of components (B) is always 100.

5. A process of claim 4 wherein 13.3 to 50% by weight of the copolymer is formed by reaction of acrylic acid of component (B) and the glycidyl ester of component (A).

6. A process of claim 1 wherein component (A) is 10 to 30% by weight of at least one glycidyl ester of an aliphatic saturated monocarboxylic acid having a tertiary or quaternary α-carbon atom, the ester having 12 to 14 carbon atoms and component (B) is 90 to 70% by weight of at least two unsaturated copolymerizable monomers with at least one monomer and consisting of
   (a) between 3.3 and 20% by weight of acrylic acid, methacrylic acid or a combination of both,
   (b) between 0 and 43% by weight of at least one hydroxyalkyl ester of acrylic acid, methacrylic acid or a combination of both which ester has between 2 and 4 carbon atoms in the hydroxyalkyl radical,
   (c) between 0 and 57% by weight of at least one ester of a monohydric alcohol having 1 to 8 carbon atoms an of acrylic acid, methacrylic acid or a combination of both acids, and
   (d) between 0 and 72% by weight of at least one vinylaromatic compound,
wherein the total of components (B) is always 100, the total of ester (b) and (c) being at most 75% by weight and wherein the copolymerization is carried out in the presence of up to 5% of a solvent to obtain a copolymer with viscosity of 30 to 2000 mPa.s measured as a 50% solution in xylene at 20° C.

* * * * *